United States Patent [19]

Ivanovich et al.

[11] Patent Number: 5,163,461
[45] Date of Patent: Nov. 17, 1992

[54] SELF-ERECTING SHELTER

[76] Inventors: Michael K. Ivanovich; Richard D. Clark, both of 1141 Arden St., Encinitas, Calif. 92024

[21] Appl. No.: 777,993

[22] Filed: Oct. 17, 1991

[51] Int. Cl.⁵ .............................................. E04H 15/40
[52] U.S. Cl. ................................... 135/104; 135/106; 135/905
[58] Field of Search ............... 135/102, 104, 106, 109, 135/905

[56] References Cited

U.S. PATENT DOCUMENTS

| | | | |
|---|---|---|---|
| 3,534,750 | 10/1970 | Kolozsvary | 135/102 |
| 3,540,458 | 11/1970 | Osterhoudt | 135/102 |
| 3,675,667 | 7/1972 | Miller | 135/1 R |
| 3,848,615 | 11/1974 | Warner et al. | 135/4 R |
| 3,990,463 | 11/1976 | Norman | 135/4 R |
| 4,154,253 | 5/1979 | McCullough | 135/102 |
| 4,825,892 | 5/1989 | Norman | 135/104 |
| 4,858,634 | 8/1989 | McLeese | 135/104 |

Primary Examiner—David A. Scherbel
Assistant Examiner—Lan Mai
Attorney, Agent, or Firm—Henri J. A. Charmasson

[57] ABSTRACT

A self-erecting shelter having a top, sides and floor made of a one-piece fabric envelope with a built-in armature made from a single and continuous length of steel wire coiled into two loops. The entire structure can be folded, twisted and bound into a flat circular package for transportation and storage. When released, the collapsed structure instantaneously springs back into a complete and fully erected shelter.

9 Claims, 5 Drawing Sheets

SELF-ERECTING SHELTER

FIELD OF THE INVENTION

This invention relates to tents and other light, temporary structures made of canvas stretched over a collapsible armature.

BACKGROUND OF THE INVENTION

There is, in the prior art, several types of self-erecting tents which rely on a springy armature made of a plurality of loops to instantaneously deploy the folded tent. The armature loops are made from a highly resilient material with a good memory such as steel. A most advanced example of this type of structure is disclosed in U.S. Pat. No. 4,858,634 McLeese. In the structure, the springy armature is made from a first elliptical loop acting as a base, and one or more other elliptical loops which have been bent arcuately and upwardly to form the roof support. The loops are attached together at opposite ends of the shortest diameter of the base loop.

In the fabrication of this type of self-erecting structure, it is difficult to select a armature wire gauge which offers sufficient support and yet enough flexibility to allow a person of average size and strength to easily fold the structure. Excessive rigidity, not only makes it difficult to fold the tent, but may also create a safety hazard and place too much stress on the tent fabric if the armature opens up too quickly and with too much force.

In this type of structure, it is also difficult to separate the fabric envelope from the armature for cleaning purpose.

There is a need for an improved self-erecting structure of the type disclosed in U.S. Pat. No. 4,858,634 that would retain the main advantage of a rapid erection, but that would be easier to fold and take apart.

SUMMARY OF THE INVENTION

The principal and secondary objects of this invention are to provide a self-erecting fabric shelter using a self-deploying steel armature which offers substantial support and quick deployment, without necessitating a great deal of physical strength to fold, and wherein a fabric envelope can be easily separated from the armature for repair or cleaning.

These and other valuable objects are achieved by using an armature made from a single and continuous length of steel wire coiled into at least two loops. The ends of the loops are axially connected by a tubular sleeve which allows for a swiveling movement of one end of the wire in relation to the other.

DESCRIPTION OF THE PREFERRED EMBODIMENTS OF THE INVENTION

Figure 1:
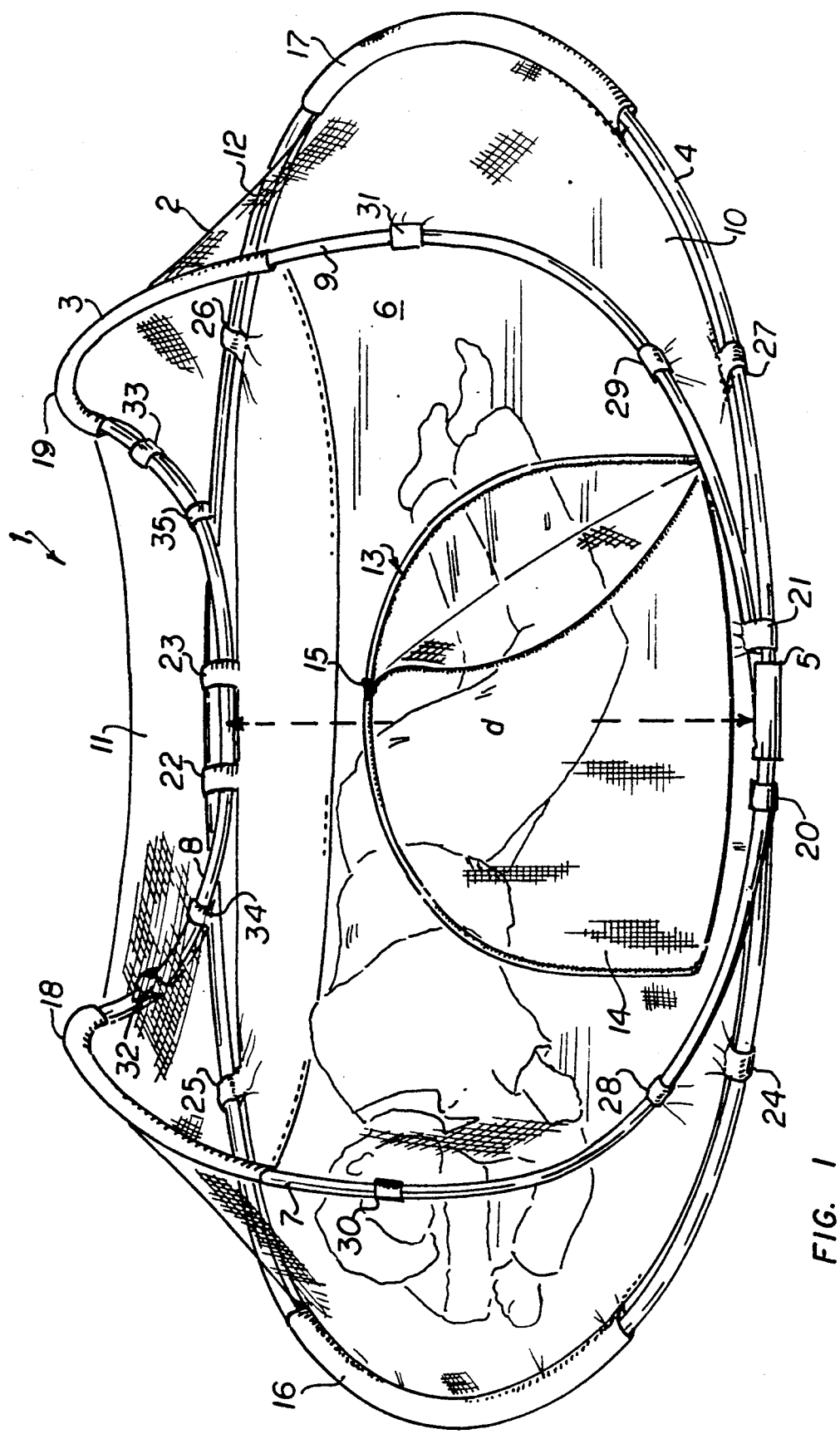
FIG. 1 is a perspective view of a tent according to the invention.

Referring now to the drawing, there is illustrated in FIG. 1 a tent 1 shaped and sized to provide shelter for one or two individuals. The fabric 2 which forms the envelope of the tent is shown in transparency for convenience, but could be made of canvas, vinyl-coated nylon or any other conveniently pliable, laminar material. The armature 3 of the tent is formed by a single and continuous, resilient, filiform member coiled into a base or ground loop 4 beginning at the sleeve connector 5, and defining a substantially elliptical base or footprint 6. The roof and wall support is constituted by a second loop 7 of the same filiform member beginning at, and ending into said connector 5. The two loops 4 and 7 are substantially symmetrical but the two half-sections 8, 9 of the roof-supporting loop 7 on either side of the smallest diameter d of the tent have been arcuately bent toward each other in the shape of two supporting arches. The envelope or sheltering canvas 2 comprises an elliptical floor 10, a slightly smaller elliptical roof section 11, and a frustroconical, peripheral wall 12. A door 13 is formed by a semicircular cutout in the wall and forms a flap 14 secured by a slide fastener 15. The envelope 2 is attached and suspended to the armature 3 by a plurality of fabric loop members 16-35. Each loop member is intangentially attached to an outside surface of the envelope 2. The securing loops may be of different lengths, and may be spaced apart at varying distances as may be necessary to guarantee a smooth and even deployment of the envelope 2.

The filiform member 3 is preferably made from a strong, resilient material having a good memory such as steel. Although various materials such as fiberglass and even rattan might be suitable for some applications, the preferred embodiment uses a ASTMA 229 steel wire in a range from 10 gauge for child's tent to 6 gauge for a family-size shelter. To protect the wire against rust, it is preferably coated with vinyl or inserted in a sleeve 36 of vinyl or other synthetic material. Optionally, the sleeve 36 may be heat-shrunk over the steel wire.

Figure 2:
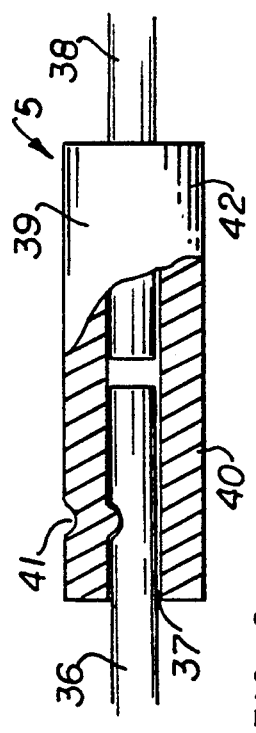
FIG. 2 is a cross-sectional view of a armature swiveling connector.

The joining of the two ends 37, 38 of the steel wire is illustrated in FIG. 2. A metal sleeve 39 has one of its extremities 40 engaged over one of the wire ends 37 and is fixed thereupon by swaging an area 41 of the sleeve into the wire end 37. The opposite extremity 42 of the sleeve axially engages the other end 38 of the wire in a sliding relationship which also allows rotational movement of the wire end 38 within the sleeve 39. The arcuate bias of the coils 4, 7 is sufficient to keep the free end 38 of the wire safely into the sleeve 39. This type of swivel connector 5 not only facilitates the assembly and disassembly of the envelope and armature, but also reduces the amount of force necessary to collapse and fold the tent by reducing the degree of torsion imposed to the wire during the folding process.

Figure 3:
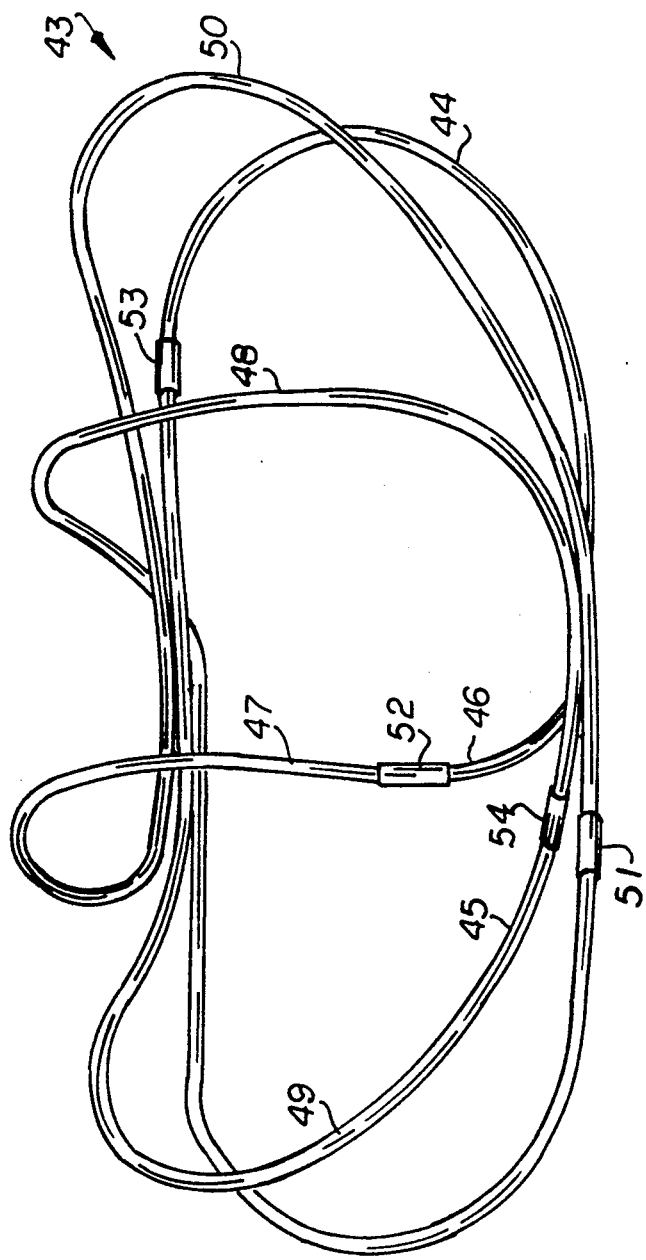
FIG. 3 is a perspective view of a three-loop armature.

An alternate armature 43 more particularly intended for a large shelter is illustrated in FIG. 3. It is made from a steel wire coiled into three substantially symmetrical, elliptical loops a planar base loop 44 and two roof-supporting loops 45, 46 which have been arcuately bent to different angles to form two pairs of arches 47, 48 and 49, 50. In order to facilitate the attachment and separation of the canvas shell or envelope of the type shown in FIG. 1, a plurality of swiveling connectors 51-54 like the one illustrated in FIG. 2 are provided at substantially equal intervals along the wire loops. It should be understood that the number of loops and their bending angles can be varied to accommodate different types and sizes of self-erecting shelters.

Figure 4:
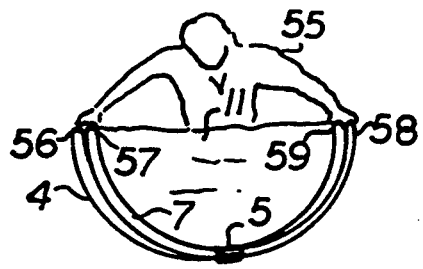
FIGS. 4-9 illustrate the shelter folding process.
Figure 5:
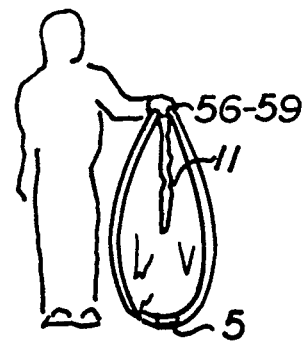
Figure 6:
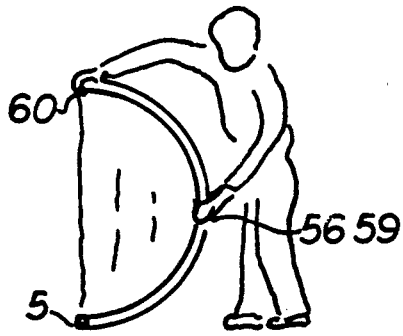
Figure 7:
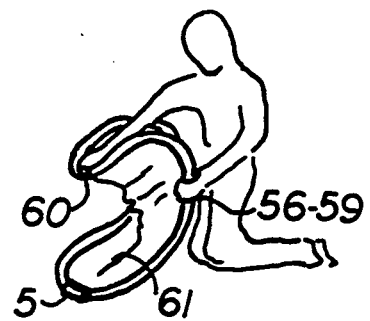
Figure 8:
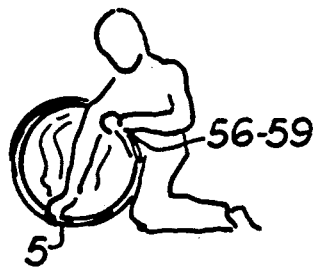
Figure 9:
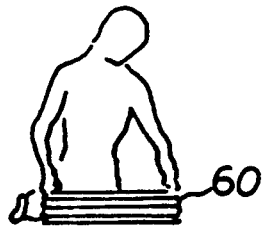

The folding process for a tent of the type illustrated in FIG. 1 is shown in FIGS. 4-9. In a first step, the operator 55 brings together the ends 56, 57 and 59, 58 of the planar loop 4 and bent loop 7 as shown in FIG. 4. He then brings the four ends together, collapsing in the meantime the roof 11 as shown in FIG. 5. Rotating the structure 90% within a vertical plane, the operator grabs the section 60 where the two loops 4, 7 meet opposite the connector 5 as shown in FIG. 5, then presses downward to bring that point 60 in the area 61 behind the connector 5. As shown in FIG. 7, continuing the curling movement, the operator pushes the bunched ends 56, 59 toward the connector 5 as shown in FIG. 8 until the now roughly spherical structure collapses into the disk configuration illustrated in FIG. 9. The tent can be tied down and kept in that configuration for transportation or storage. It will spontaneously deploy into a fully erected tent as soon as the restraint is removed.

Figure 10:
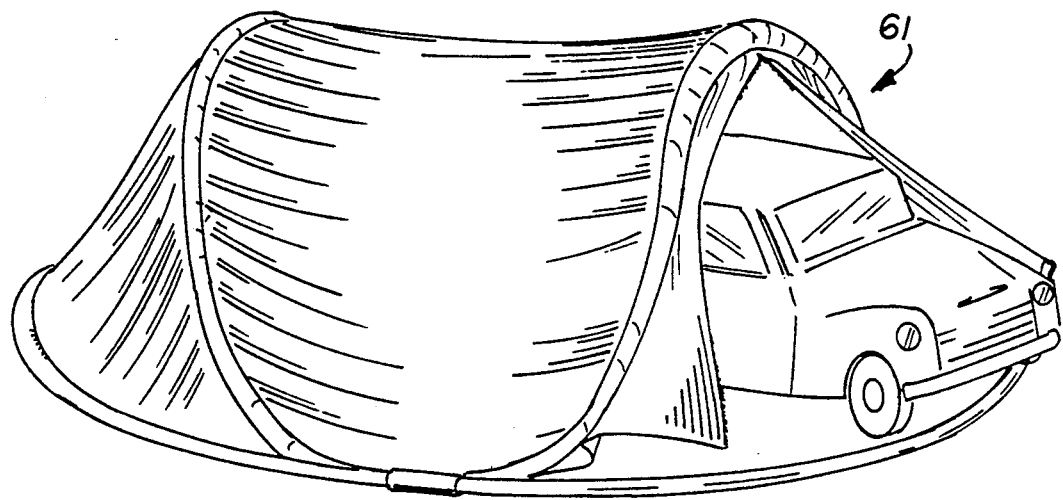
FIG. 10 illustrates an application of the invention to form a garage.
Figure 11:
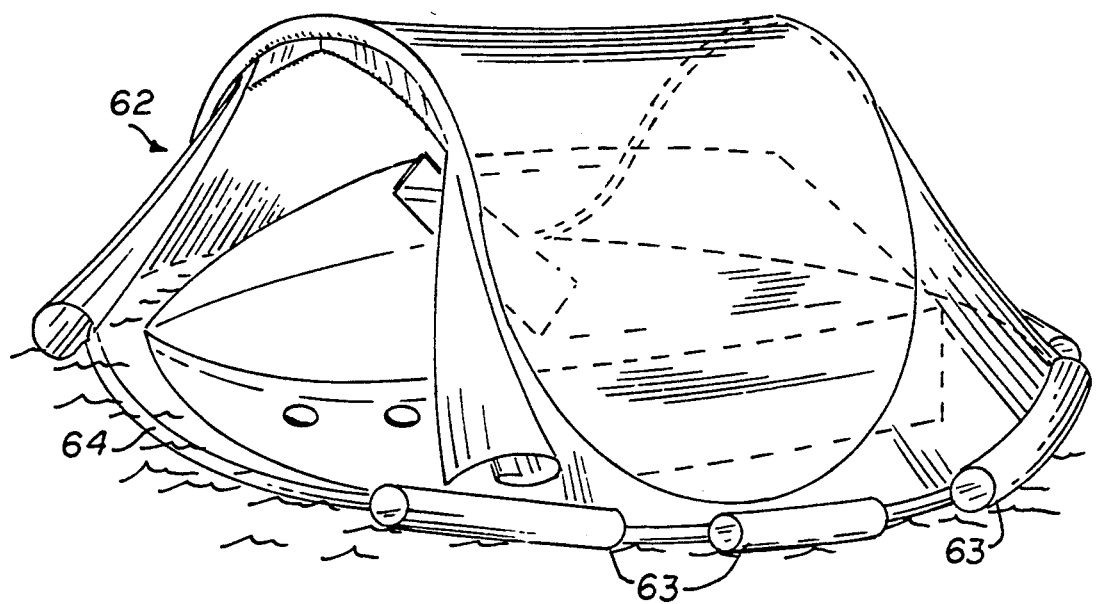
FIG. 11 illustrates a floating boat shelter according to the invention.

It should be understood that structures of the type just described can be made of various sizes and for various purposes. For example, a similar structure having a transparent envelope made from a polyvinyl film or other similar material, and devoid of any floor section, could be used as a hot house over plants and crops. Other purposes may include a spraying booth or temporary garage 61 as illustrated in FIG. 10, or a floating boat shelter 62 as illustrated in FIG. 11. In this latter embodiment of the invention, buoyant elements 63 are secured to the base loop 64.

Figure 12:
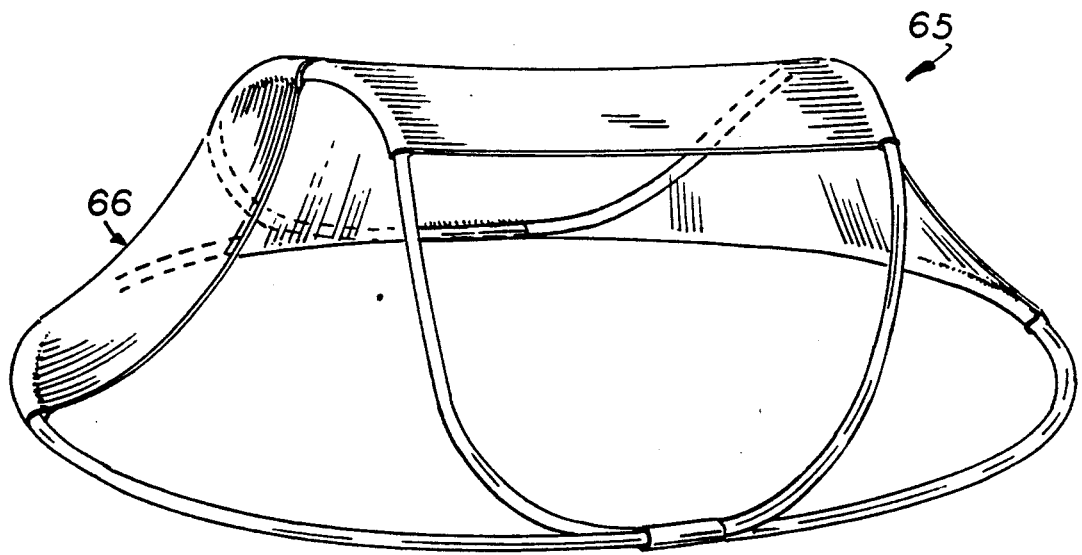
FIG. 12 illustrates a sun-canopy built according to the invention.

The embodiment 65 illustrated in FIG. 12 has no floor section, and its canvas wall 66 extends only over half of its periphery. Such an embodiment can be advantageously used as a shelter against the sun, such as on the beach, or as a trade show display booth.

Figure 13:
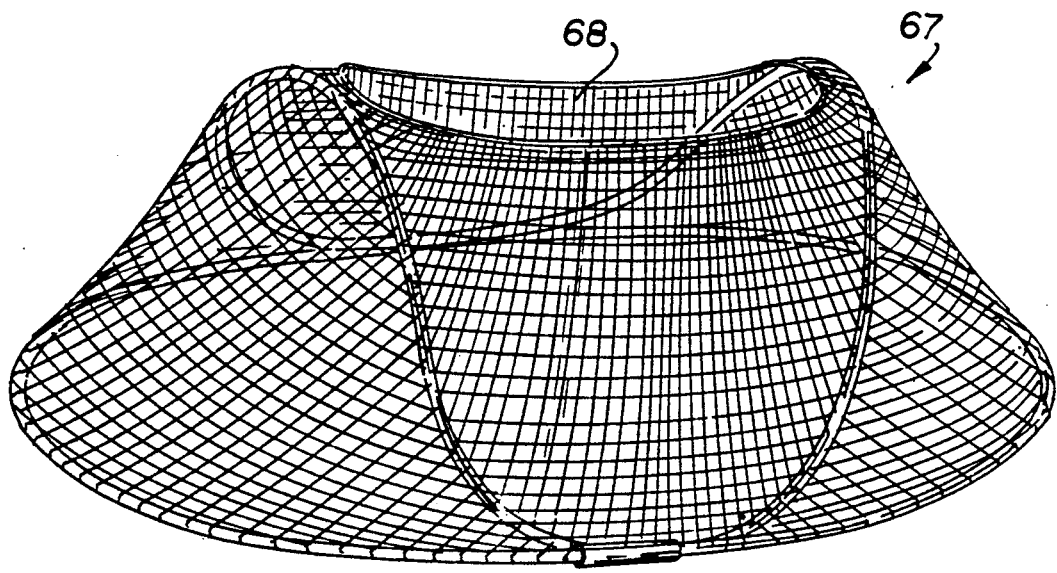
FIG. 13 illustrates a space-restricting device according to the invention, usable as playpen.

The embodiment 67 illustrated in FIG. 13 uses a netting to form the peripheral walls 68, and has an open roof section 68. This type of structure can advantageously be used as a child playpen, as an animal pen or other restraining structure.

While the preferred embodiments of the invention have been described, modifications can be made and other embodiments may be devised without departing from the spirit of the invention and the scope of the appended claims.

What is claimed is:

1. A self-erecting shelter which comprises:
   an armature formed by a single and continuous, resilient, filiform member coiled into at least two substantially symmetrical loops wherein at least two diametrically opposed half-sections of said loops are arcuately bent toward each other;
   said member having first and second ends axially facing each other;
   means for connecting said ends; and
   an envelope made of soft, pliable, laminar material wrapped around said armature and having means for attaching to said armature, wherein said means for attaching comprise a plurality of loops tangentially joined to said envelope and loosely capturing portion of said filiform member.

2. The shelter of claim 1, wherein said means for connecting comprise a tubular sleeve rotatively and axially engaging one of said ends.

3. The shelter of claim 2, wherein said tubular sleeve has one of its extremities fixedly engaged over one of said ends and has an opposite extremity loosely and detachably engaged over the other of said ends.

4. The shelter of claim 2, wherein said armature comprises two diametrically opposed, substantially semi-elliptical half-sections of said loops lying in a common base plane.

5. The shelter of claim 4, which further comprises a plurality of supports attached to said base plane half-sections.

6. The shelter of claim 5, wherein said supports comprise buoyant elements.

7. The shelter of claim 4, wherein said envelope comprises a roof section having an opening between said arcuately bent half-sections.

8. The shelter of claim 2, wherein said filiform member is coiled into at least three loops; and
   wherein at least two pairs of diametrically opposed half-sections of said loops are arcuately bent toward one another.

9. The shelter of claim 2, wherein said filiform member comprises a plurality of successive segments; and
   means for swivelingly and axially connecting said segments into a continuous, multi-loop armature.

* * * * *